US008678417B1

(12) United States Patent
Chang (10) Patent No.: US 8,678,417 B1
(45) Date of Patent: Mar. 25, 2014

(54) UNIVERSAL FRAME FOR ELECTRIC BIKES AND HUMAN POWERED BICYCLES

(71) Applicant: Vulcan Sports Co., Ltd., Changhua (TW)

(72) Inventor: Chin Shu Chang, Changhua (TW)

(73) Assignee: Vulcan Sports Co., Ltd., Changhua (TW)

( * ) Notice: Subject to any disclaimer, the term of this patent is extended or adjusted under 35 U.S.C. 154(b) by 0 days.

(21) Appl. No.: 13/627,482

(22) Filed: Sep. 26, 2012

(51) Int. Cl.
*B62K 1/00* (2006.01)
(52) U.S. Cl.
USPC .......................... 280/281.1; 264/258; 264/313
(58) Field of Classification Search
USPC ......... 280/281.1, 288.2, 288.3, 274; 264/258, 264/313
See application file for complete search history.

(56) References Cited

U.S. PATENT DOCUMENTS

| 648,657 A | * | 5/1900 | Dikeman | 384/431 |
| 670,957 A | * | 4/1901 | Johnson | 384/431 |
| 5,967,537 A | * | 10/1999 | Chang | 280/259 |

* cited by examiner

*Primary Examiner* — Tony Winner
*Assistant Examiner* — Jacob Knutson
(74) *Attorney, Agent, or Firm* — Guice Patents PLLC (57) ABSTRACT

The present invention relates to a universal frame for electric bikes and human powered bicycles, the frame body of the universal frame is consisted of a top tube, a down tube, a seat tube, two seat stays and two chain stays, wherein a holder is welded on the junction of the down tube, the seat tube and the chain stays, the holder is used to fasten on a bottom bracket shell with different specifications according to usage requirements. By the composition of the above elements, the present invention may be provided to assemble the main-shaft-chain wheel set of electric bikes or human powered bicycles, to thereby simplify the process, reduce the amount of inventories and achieve the convenience of universal interchangeability.

8 Claims, 8 Drawing Sheets

UNIVERSAL FRAME FOR ELECTRIC BIKES AND HUMAN POWERED BICYCLES

BACKGROUND OF THE INVENTION

1. Field of the Invention

The invention relates to a universal frame for electric bikes and human powered bicycles and, more particularly, to a bicycle frame universal for electric bikes and human powered bicycles, to thereby simplify the process and reduce the amount of inventories effectively, and achieve the convenience of universal interchangeability.

2. Brief Description of the Related Art

Figure 1:
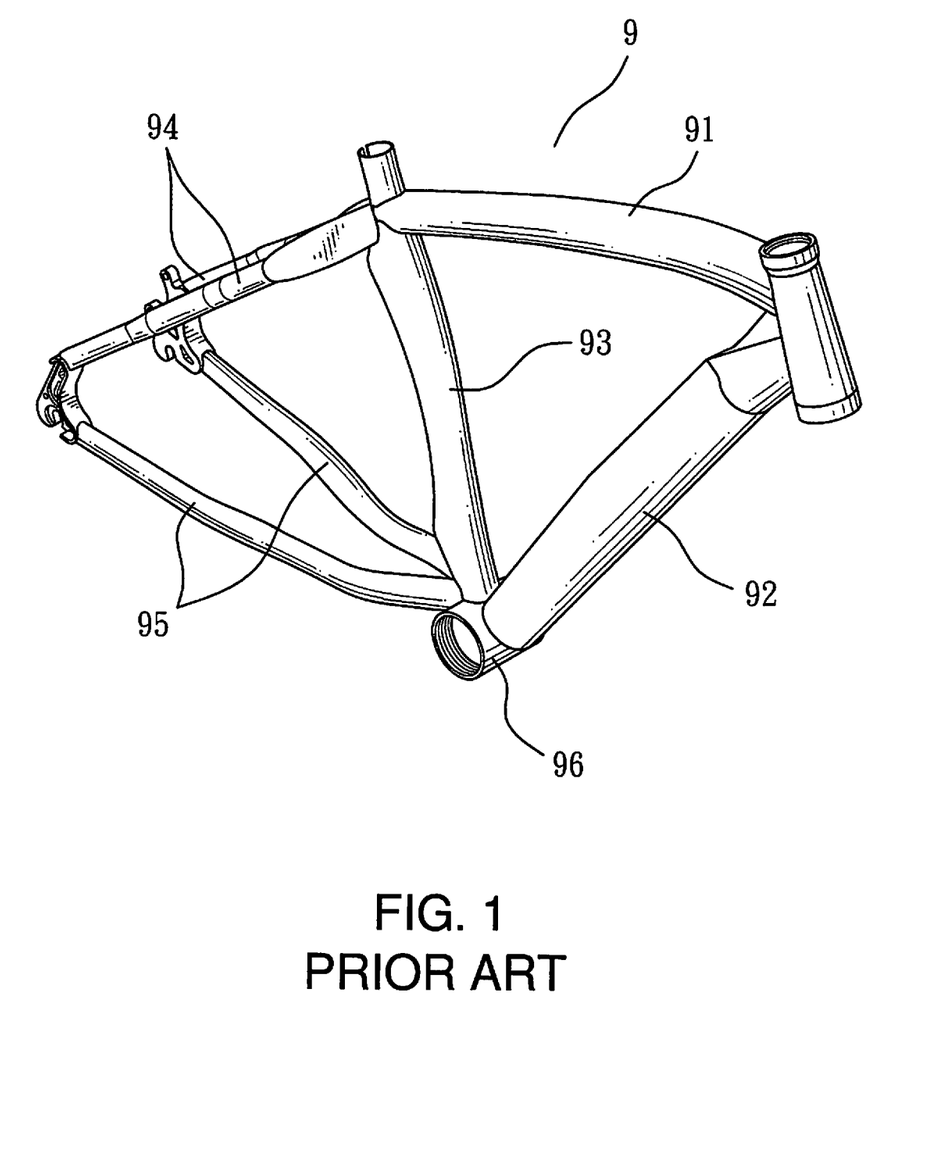
FIG. 1 is a three-dimensional diagram of a conventional frame.

A conventional bicycle frame 9 is shown in FIG. 1, the bicycle frame 9 is consisted of a top tube 91, a down tube 92, a seat tube 93, two seat stays 94 and two chain stays 95, wherein a bottom bracket shell 96 is welded on the junction of the down tube 92 and the chain stays 95, the bottom bracket shell 96 is provided for assembling a main-shaft-chain wheel set (the main-shaft-chain wheel set is a prior art structure and not shown in figure). It is a basic structure of a conventional human powered bicycle. However, with the advances in technology, one kind of electric bike is invented for reducing physical burden of riders. In this kind of electric bike, the main-shaft-chain wheel set is connected to a tube motor for being transmitted by electric power, such as related patent applications EP1878650B1. Since the tube motor is not the feature of the present invention, no more detail here. For the manufacture of bicycle frames, the problem is that the specification of the bottom bracket shells 96 of human powered bicycle and electric bikes are different and cannot be universal. The manufacture have to weld different bottom bracket shells 96 on the same bicycle frame 9 depending on different use requirements (electric bikes or human powered bicycles). Thus, not only increase the inconvenience of the process and make inventory increased greatly, but also affect the sales willingness of bike shops, which should furnish double products in limited store space.

SUMMARY OF THE INVENTION

In view of this, the inventor finally completes the invention of the frame universal for electric bikes and human powered bicycles after numerous improvements, namely, the object of the invention is to provide an universal frame for electric bikes and human powered bicycles, to thereby simplify the process and reduce the amount of inventories effectively, and achieve the convenience of universal interchangeability.

To achieve the object, the frame body of the universal frame is consisted of a top tube, a down tube, a seat tube, two seat stays and two chain stays, a holder is welded on the junction of the down tube, the seat tube and the chain stays, the holder is used to fasten on a bottom bracket shell with different specifications according to usage requirements, wherein:

the holder, the outer surface of the top is provided for connecting to each fitting of the frame body, an inner hole is set on the outer surface, multiple first locking holes are set on the circumference of the inner hole, a capacity space is set concavely inside the holder for assembling the bottom bracket shell;

the bottom bracket shell, which is provided for assembling a main-shaft-chain wheel set, an upper tube flange set on the top of the shell body is set into the inner hole, two side tube flange are set on two sides of the shell body respectively, the side tube flange has a side through-hole, an upper through-hole is set on the upper tube flange, multiple second locking holes are set near the circumference of the upper tube flange, the second locking holes are corresponding to the first locking holes of the holder for corresponding first locking bolts locking in, to thereby fasten the bottom bracket shell and the holder.

BRIEF DESCRIPTION OF THE INVENTION

The detail structure, the applied principle, the function and the effectiveness of the present invention can be more fully understood with reference to the following description and accompanying drawings, in which.

DETAILED DESCRIPTION OF THE PREFERRED EMBODIMENTS

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Figure 2:
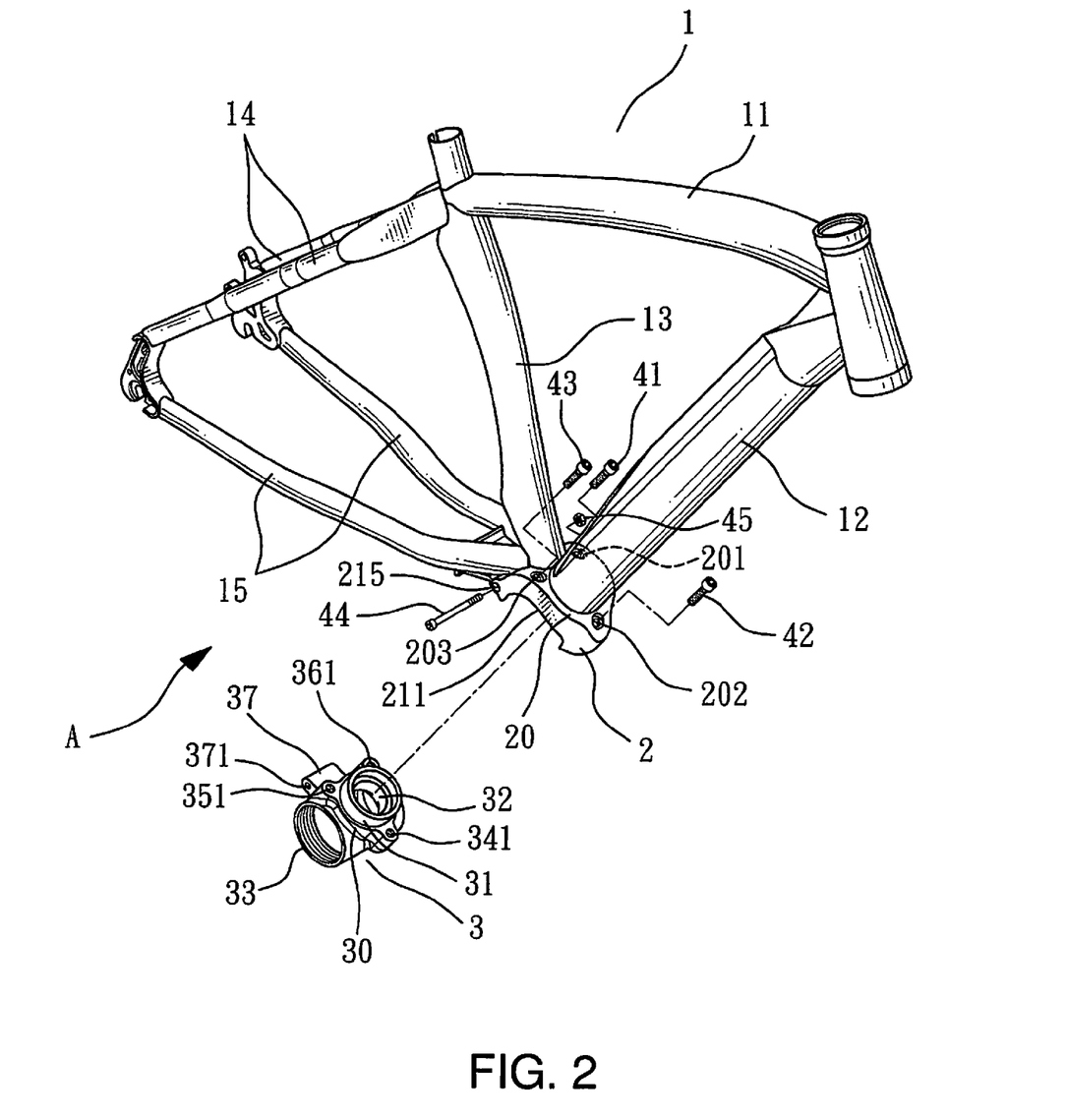
FIG. 2 is a three-dimensional exploded diagram according to the present invention.
Figure 3:
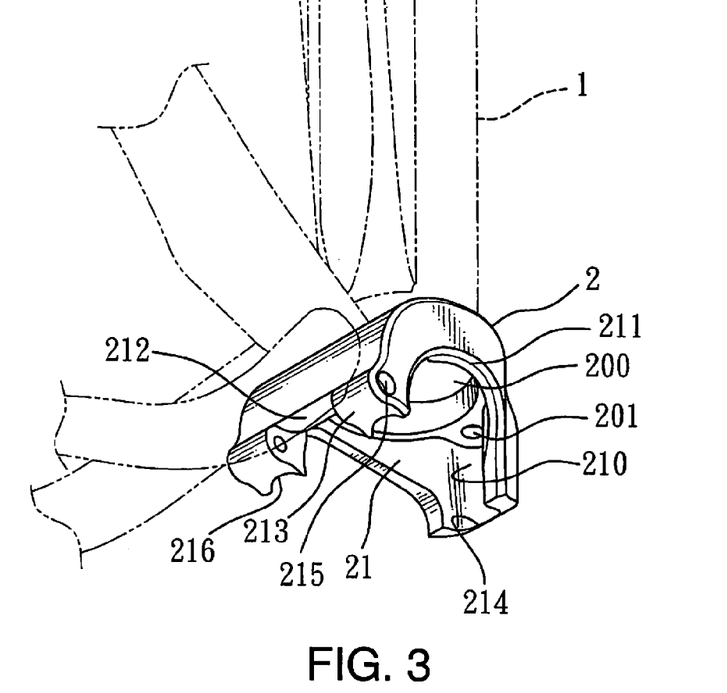
FIG. 3 is a three-dimensional schematic diagram of the holder of the present invention.
Figure 4:
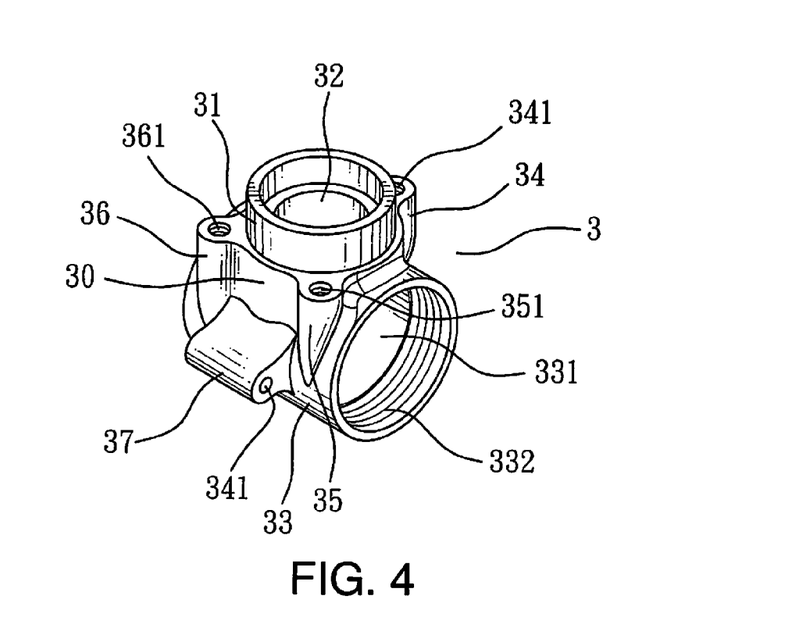
FIG. 4 is a three-dimensional schematic diagram of the bottom bracket shell of the present invention.
Figure 5:
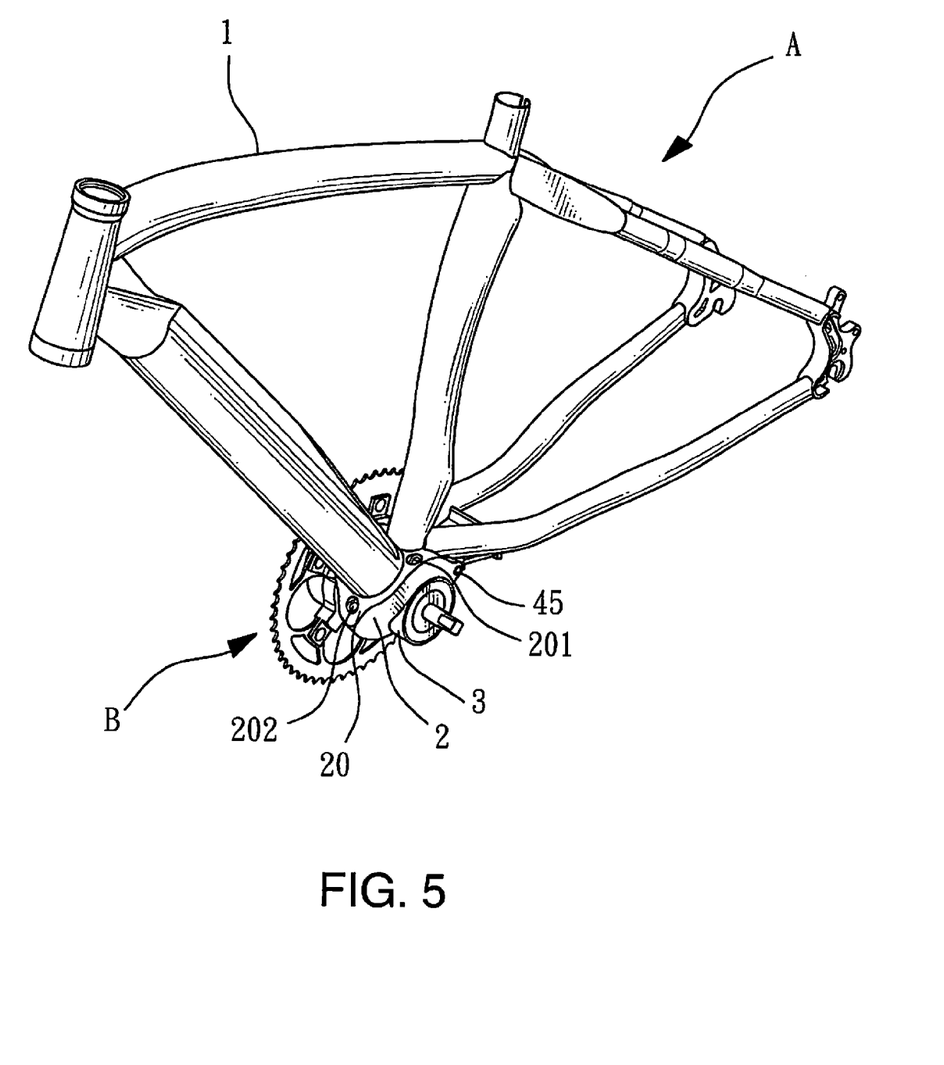
FIG. 5 is a three-dimensional schematic diagram of the present invention implemented on the frame of a human powered bicycle.
Figure 7:
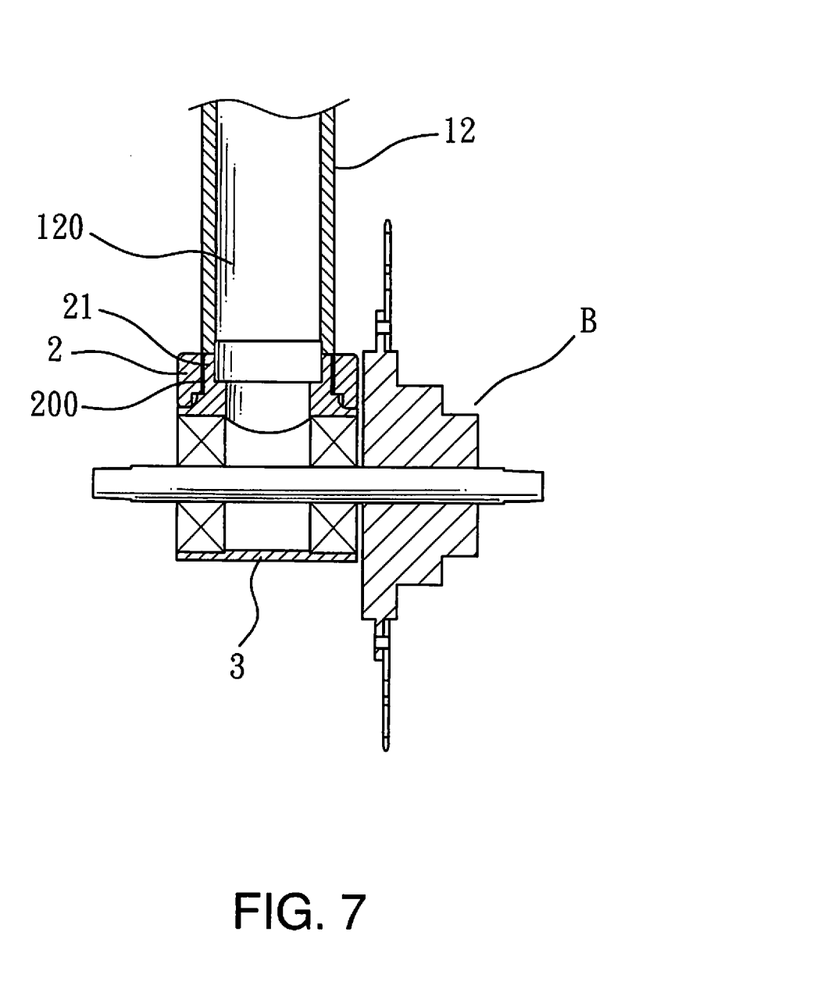
FIG. 7 is a I-I cross-section diagram of FIG. 6 according to the present invention.

Please refer to FIG. 2, FIG. 3 and FIG. 4, the universal frame A for electric bikes and bicycles, the frame body 1 of the universal frame A is consisted of a top tube 11, a down tube 12, a seat tube 13, two seat stays 14 and two chain stays 15, a holder 2 is welded on the junction of the down tube 12, the seat tube 13 and the chain stays 15, the holder 2 is used to fasten on a bottom bracket shell 3 with different specifications according to usage requirements, wherein:

the holder 2, the outer surface 20 of the top is provided for connecting to each fitting of the frame body 1 (the fittings at least includes the top tube 11, the down tube 12 and the seat tube 13), an inner hole 200 is set on the outer surface 20, multiple first locking holes 201, 202, 203 are set on the circumference of the inner hole 200, a capacity space 21 is set concavely inside the holder 2 for assembling the upper half part of the bottom bracket shell 3, a front side wall 210 is set in front of the holder 2, the inner side of the front side wall 210 has a first concave cambered surface 214, two side cavities 211 are respectively set on two sides of the holder 2, a rear cavity 212 is set on the rear side of the holder 2, two first rear convex parts 213 are respectively adjacent to two sides of the rear cavity 212, a first side hole 215 is laterally set on the rear convex part 213, the inner side of the first rear convex part 213 has a second concave cambered surface 216;

the bottom bracket shell 3, which is provided for assembling a main-shaft-chain wheel set B (as shown in FIG. 5 and FIG. 7), an upper tube flange 31 set on the top of the shell body 30 is set into the inner hole 200, an upper through-hole 32 is set on the upper tube flange 31, multiple convex parts 34, 35, 36 are set near the circumference of the upper tube flange 31, multiple second locking holes 341, 351, 361 are respectively set on the convex parts 34, 35, 36, the second locking holes 341, 351, 361 are corresponding to the first locking holes 201, 202, 203 of the holder 2 for corresponding first locking bolts 41, 42, 43 locking in, to thereby fasten the bottom bracket shell 3 and the holder 2, two side tube flanges 33 are respectively set on two sides of the shell body 30, the side tube flange 33 has a side through-hole 331, an internal thread 332 is set inside the side through-hole 331. A second rear convex part 37 is set on the rear side of the shell body 30, a second side hole 371 is laterally set on the second rear convex part 37, the second rear convex part 37 is embedded in the cavity 212 of the holder 2, the second side hole 371 corresponding to the first side hole 215 is provided for a second locking bolt 44 passed through and fastened by a nut 45.

By the composition of the above elements, users may choose the bottom bracket shell 3 with different specifications to assemble the holder 2. When assembling, the upper tube flange 31 of the bottom bracket shell 3 is set inside the inner hole 200 of the holder 2, the convex parts 34, 35, 36 are respectively propped up the first concave cambered surface 214 and the second concave cambered surface 216, the first locking holes 201, 202, 203 respectively correspond to the second locking holes 341, 351, 361 for the first locking bolts 41, 42, 43 fastening in, and the first side hole 215 corresponds to the second side hole 371 for a second locking bolt 44 passed through and fastened by a nut 45, to thereby complete the fastening assembly of the bottom bracket shell 3 and the holder 2.

Figure 6:
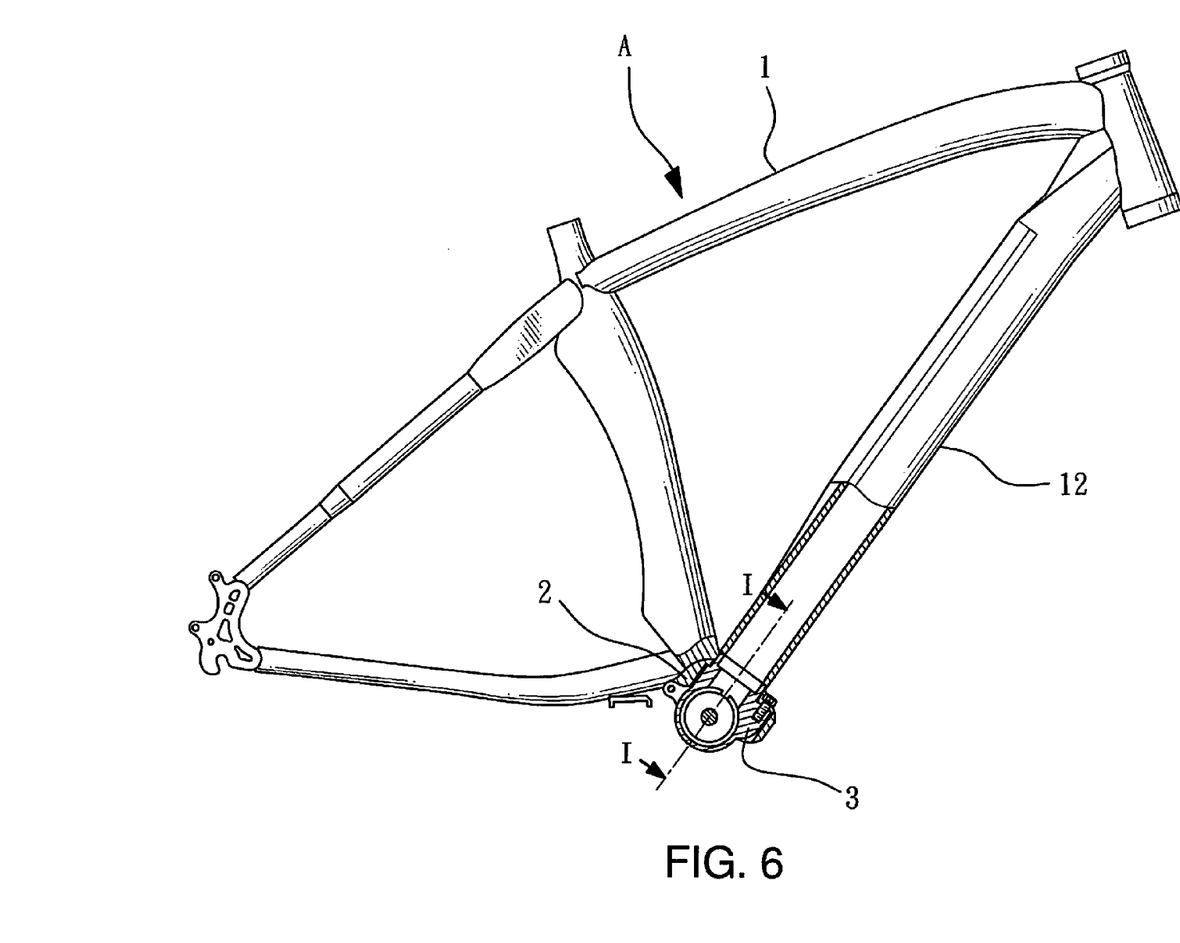
FIG. 6 is a cross-section schematic diagram of the present invention implemented on the frame of a human powered bicycle.
Figure 8:
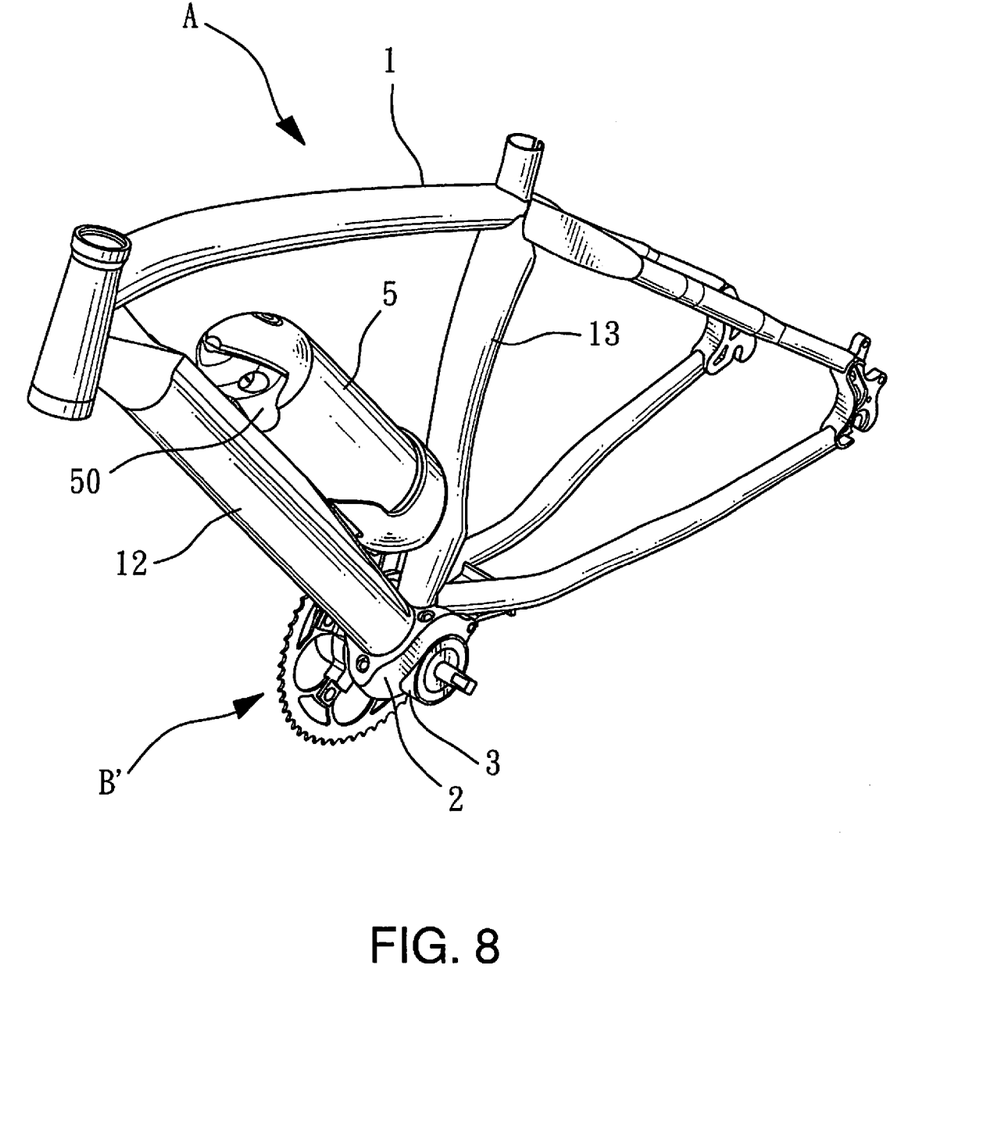
FIG. 8 is a three-dimensional schematic diagram of the present invention implemented on the frame of a electric bike.
Figure 9:
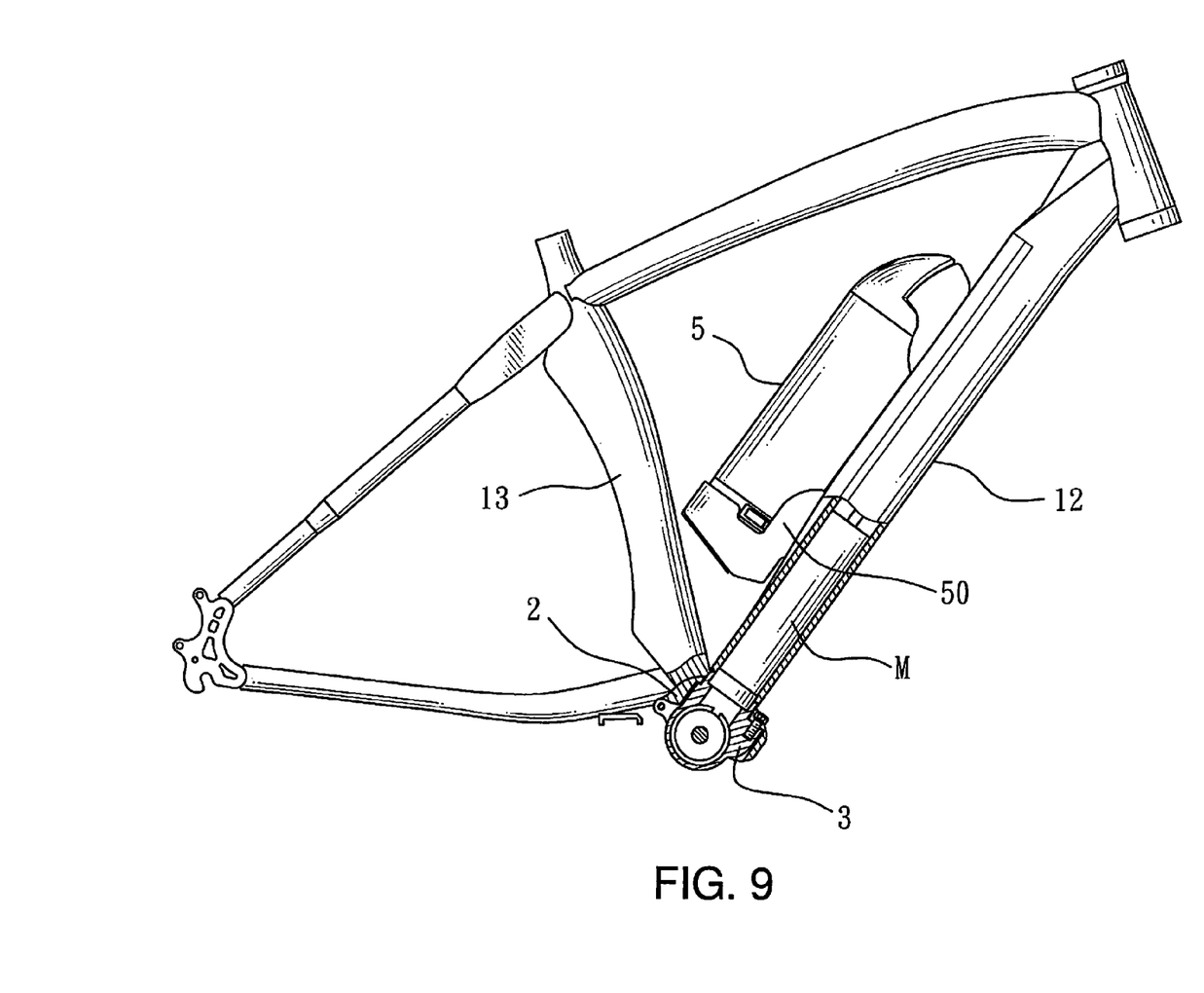
FIG. 9 is a cross-section schematic diagram of the present invention implemented on the frame of a electric bike.

Please refer to FIG. 5, FIG. 6 and FIG. 7, the embodiment of the bottom bracket shell 3 for assembling a human powered bicycle is shown. The bottom bracket shell 3 may be provided for assembling a main-shaft-chain wheel set B; please refer to FIG. 8 and FIG. 9, the embodiment of the bottom bracket shell 3 for assembling an electric bike is shown, wherein a tube motor M is set inside the down tube 12, the tube motor M is electrically connected to the main-shaft-chain wheel set B assembled on the bottom bracket shell 3 (this part is not the technical characteristic of the present invention and is prior art, so it is not disclosed here), and a battery holder 50 welded on the down tube 12 is provided to put a battery 5 for supplying needed power to the tube motor M.

Above all, the present invention may provide users to choose the bottom bracket shells with different specifications to fasten assemble the holder of the frame body depending on the assembly requirements of electric bikes or human powered bicycles, to thereby achieve the purpose of assembling conveniently, simplifying the process and reducing inventories.

I claim:

1. A universal frame for electric bikes and human powered bicycles, a frame body of the universal frame is consisted of a top tube, a down tube, a seat tube, two seat stays and two chain stays, a holder is welded on a junction of the down tube, the seat tube and the chain stays, the holder is used to fasten on a bottom bracket shell with different specifications according to usage requirements, wherein:

the holder, an outer surface of a top is provided for connecting to the top tube, the down tube and the seat tube of the frame body, an inner hole is set on the outer surface, multiple first locking holes are set on a circumference of the inner hole, a capacity space is set concavely inside the holder for assembling the bottom bracket shell;

the bottom bracket shell, which is provided for assembling a main-shaft-chain wheel set, an upper tube flange set on a top of a shell body is set into the inner hole, two side tube flanges are set on two sides of the shell body respectively, the side tube flanges have a side through-hole, an upper through-hole is set on the upper tube flange, multiple second locking holes are set near a circumference of the upper tube flange, the second locking holes are corresponding to the first locking holes of the holder for corresponding first locking bolts locking in, to thereby fasten the bottom bracket shell and the holder;

wherein a rear cavity is set on a rear side of the holder, two first rear convex parts are respectively adjacent to two sides of the rear cavity, a first side hole is laterally set on the rear convex part, an inner side of the first rear convex part has a second concave cambered surface.

2. The universal frame for electric bikes and human powered bicycles as claimed in claim 1, wherein a front side wall is set in front of the holder, an inner side of the front side wall has a first concave cambered surface.

3. The universal frame for electric bikes and human powered bicycles as claimed in claim 1, wherein two side cavities are respectively set on two sides of the holder.

4. The universal frame for electric bikes and human powered bicycles as claimed in claim 1, wherein the two side tube flanges are respectively set on two sides of the shell body, the side tube flange has the side through-hole, an internal thread is set inside the side through-hole.

5. A universal frame for electric bikes and human powered bicycles, a frame body of the universal frame is consisted of a top tube, a down tube, a seat tube, two seat stays and two chain stays, a holder is welded on a junction of the down tube, the seat tube and the chain stays, the holder is used to fasten on a bottom bracket shell with different specifications according to usage requirements, wherein:

the holder, an outer surface of a top is provided for connecting to the top tube, the down tube and the seat tube of the frame body, an inner hole is set on the outer surface, multiple first locking holes are set on a circumference of the inner hole, a capacity space is set concavely inside the holder for assembling the bottom bracket shell;

the bottom bracket shell, which is provided for assembling a main-shaft-chain wheel set, an upper tube flange set on a top of a shell body is set into the inner hole, two side tube flanges are set on two sides of the shell body respectively, the side tube flanges have a side through-hole, an upper through-hole is set on the upper tube flange, multiple second locking holes are set near a circumference of the upper tube flange, the second locking holes are corresponding to the first locking holes of the holder for corresponding first locking bolts locking in, to thereby fasten the bottom bracket shell and the holder;

wherein a first rear convex part is set on the rear side of the shell body of the bottom bracket shell, a first side hole is laterally set on the first rear convex part.

6. The universal frame for electric bikes and human powered bicycles as claimed in claim 5, wherein a front side wall is set in front of the holder, an inner side of the front side wall has a first concave cambered surface.

7. The universal frame for electric bikes and human powered bicycles as claimed in claim 5, wherein two side cavities are respectively set on two sides of the holder.

8. The universal frame for electric bikes and human powered bicycles as claimed in claim 5, wherein the two side tube flanges are respectively set on two sides of the shell body, the side tube flange has the side through-hole, an internal thread is set inside the side through-hole.

* * * * *